US010393190B2

(12) United States Patent
Williams (10) Patent No.: US 10,393,190 B2
(45) Date of Patent: *Aug. 27, 2019

(54) DECOUPLER WITH CONCENTRIC CLUTCHING MEMBERS

(71) Applicant: Litens Automotive Partnership, Woodbridge (CA)

(72) Inventor: Warren J. Williams, Oakville (CA)

(73) Assignee: Litens Automotive Partnership, Woodbridge (CA)

( * ) Notice: Subject to any disclaimer, the term of this patent is extended or adjusted under 35 U.S.C. 154(b) by 84 days.

This patent is subject to a terminal disclaimer.

(21) Appl. No.: 15/607,914

(22) Filed: May 30, 2017

(65) Prior Publication Data

US 2017/0261046 A1   Sep. 14, 2017

Related U.S. Application Data

(63) Continuation of application No. 14/736,777, filed on Jun. 11, 2015, now Pat. No. 9,689,486, which is a
(Continued)

(51) Int. Cl.
*F16H 55/36*    (2006.01)
*F16D 13/76*    (2006.01)
(Continued)

(52) U.S. Cl.
CPC ........... *F16D 13/76* (2013.01); *F16D 41/206* (2013.01); *F16H 55/36* (2013.01); *F16D 47/04* (2013.01);
(Continued)

(58) Field of Classification Search
None
See application file for complete search history.

(56) References Cited

U.S. PATENT DOCUMENTS

| 773,320 A | 10/1904 | Haase |
|---|---|---|
| 2,396,985 A | 3/1946 | Burrus |

(Continued)

FOREIGN PATENT DOCUMENTS

| CA | 2491230 C | 6/2013 |
|---|---|---|
| EP | 1534972 B1 | 7/2003 |

(Continued)

*Primary Examiner* — Mark A Manley
(74) *Attorney, Agent, or Firm* — Millman IP Inc.

(57) ABSTRACT

In an aspect, a decoupler includes a hub, a pulley, a torsion spring, a first spring driver fixed to the pulley, and having a first stop feature for the spring; a second spring driver mounted about the hub and not fixed to the pulley, and having a second stop feature for the spring, a driving clutch shaft mounted connected to the second spring driver, a driven clutch shaft mounted concentrically with the driving clutch shaft and drivingly connected to the hub, a one-way wrap spring clutch mounted about the hub and disposed to interconnect the driving and driven clutch shafts, and configured to transfer torque in a first direction between the driving and driven clutch shafts, and an axial biasing member acting between one of (i) the pulley and the driving clutch shaft and (ii) the hub and driven clutch shaft, to urge the driving and driven clutch shafts together.

9 Claims, 7 Drawing Sheets

Related U.S. Application Data continuation of application No. 14/085,738, filed on Nov. 20, 2013, now Pat. No. 9,140,319.

(60) Provisional application No. 61/728,948, filed on Nov. 21, 2012, provisional application No. 61/728,495, filed on Nov. 20, 2012.

(51) Int. Cl.
*F16D 41/20* (2006.01)
*F16D 47/04* (2006.01)
*F16H 45/02* (2006.01)

(52) U.S. Cl.
CPC ........ *F16H 45/02* (2013.01); *F16H 2055/366* (2013.01)

(56) References Cited

U.S. PATENT DOCUMENTS

| | | | |
|---|---|---|---|
| 2,551,739 A | 5/1951 | Harlan | |
| 2,633,953 A | 4/1953 | Gorske | |
| 2,794,524 A | 6/1957 | Sacchini | |
| 2,829,748 A | 4/1958 | Sacchini et al. | |
| 2,866,349 A | 12/1958 | Heckenthorn | |
| 2,885,896 A | 5/1959 | Hungerford, Jr. et al. | |
| 2,968,380 A | 1/1961 | Sacchini | |
| RE25,229 E | 8/1962 | Sacchini | |
| 3,059,493 A | 10/1962 | Wolfram | |
| 3,242,696 A | 3/1966 | Kaplan | |
| 3,298,486 A | 1/1967 | Perryman | |
| 3,618,730 A | 11/1971 | Mould | |
| 4,460,076 A | 7/1984 | Yamada | |
| 5,064,038 A | 11/1991 | Batchelder | |
| 5,139,463 A | 8/1992 | Bytzek et al. | |
| 5,156,573 A | 10/1992 | Bytzek et al. | |
| 5,437,205 A | 8/1995 | Tseng | |
| 5,598,913 A | 2/1997 | Monahan et al. | |
| 5,879,254 A | 3/1999 | Tanaka | |
| 6,083,130 A | 7/2000 | Mevissen et al. | |
| 6,119,841 A | 9/2000 | Orlamunder | |
| 6,394,247 B1 | 5/2002 | Monahan et al. | |
| 6,394,248 B1 | 5/2002 | Monahan et al. | |
| 6,676,548 B2 | 1/2004 | Fujiwara | |
| 6,761,656 B2 | 7/2004 | King et al. | |
| 7,052,420 B2 | 5/2006 | King et al. | |
| 7,070,033 B2 | 7/2006 | Jansen et al. | |
| 7,153,227 B2 | 12/2006 | Dell et al. | |
| 7,207,910 B2 | 4/2007 | Dell et al. | |
| 7,618,337 B2 | 11/2009 | Jansen et al. | |
| 7,712,592 B2 | 5/2010 | Jansen et al. | |
| 9,689,486 B2 * | 6/2017 | Williams | F16D 41/206 |
| 2003/0098215 A1 | 5/2003 | Miller et al. | |
| 2004/0104090 A1 | 6/2004 | Jansen et al. | |
| 2004/0112700 A1 | 6/2004 | Liston et al. | |
| 2011/0224038 A1 * | 9/2011 | Aantchak | F16D 7/022 474/94 |
| 2015/0285365 A1 | 10/2015 | Alvaro et al. | |

FOREIGN PATENT DOCUMENTS

| | | |
|---|---|---|
| WO | 192741 A1 | 12/2001 |
| WO | 192746 A1 | 12/2001 |

* cited by examiner

DECOUPLER WITH CONCENTRIC CLUTCHING MEMBERS

CROSS-REFERENCE TO RELATED APPLICATIONS

This application is a continuation of U.S. patent application Ser. No. 14/736,777 filed Jun. 11, 2015, which is a continuation of U.S. patent application Ser. No. 14/085,738, filed Nov. 20, 2013, which claims priority from U.S. Provisional Patent Application No. 61/728,495 filed Nov. 20, 2012 and from U.S. Provisional Patent Application No. 61/728,948 filed Nov. 21, 2012, the contents of both of which are incorporated herein in their entirety.

FIELD OF DISCLOSURE

This disclosure relates generally to the art of hub decouplers and more particularly to overrunning alternator decouplers.

BACKGROUND OF DISCLOSURE

Figure 1:
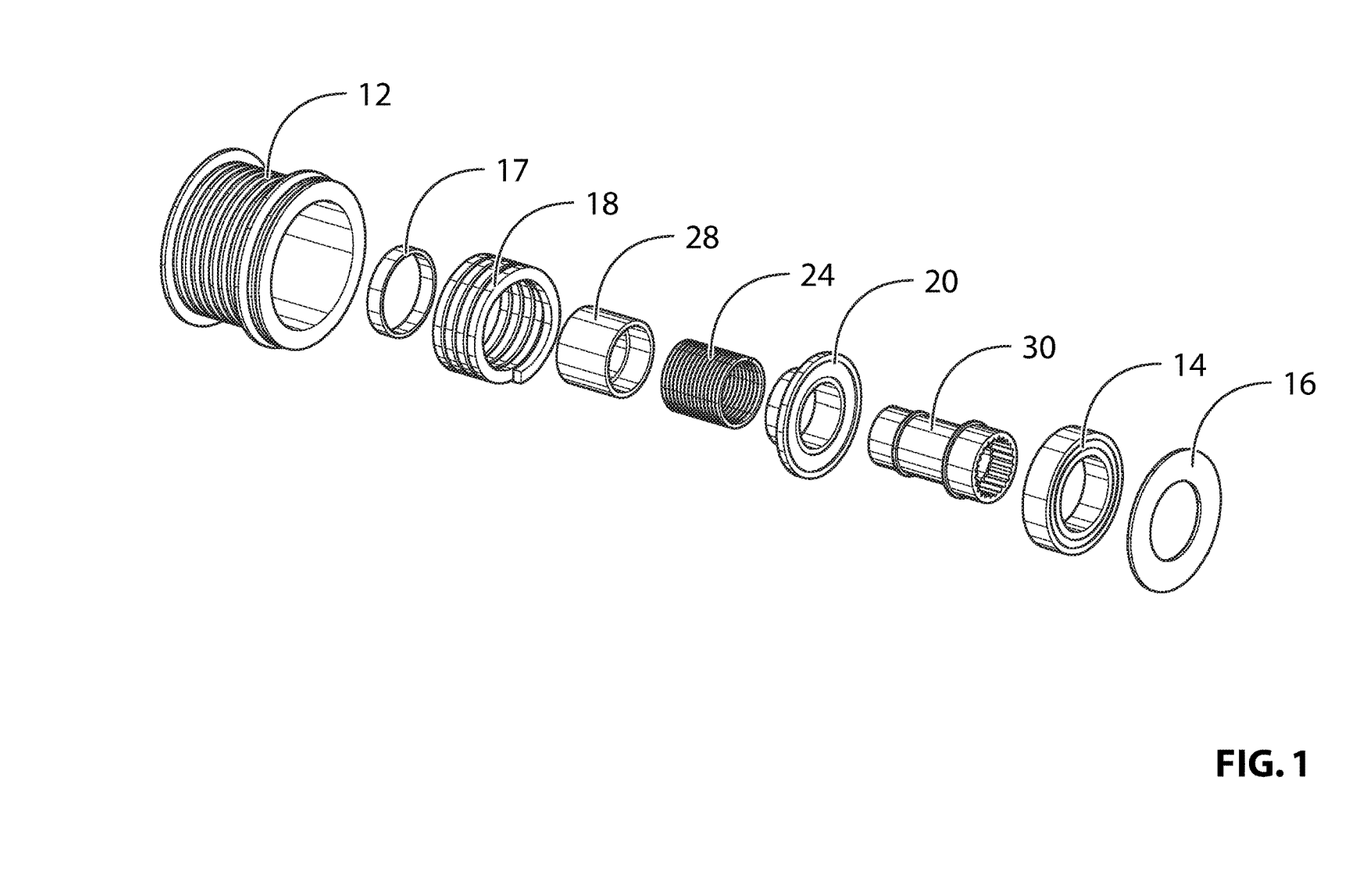
FIG. 1 shows a prior art decoupler.

FIG. 1 shows a prior art overrunning alternator decoupler 10. The main components of the prior art decoupler 10 are:
 a pulley 12;
 a bearing 14;
 a bearing cover 16;
 a bushing 17;
 a torsion spring 18;
 a driving clutch member (in this case a drum) 20;
 a one-way wrap spring clutch 24;
 a driven clutch member (in this case a drum) 28; and
 a hub 30.

In the prior art decoupler 10 the torsion spring 18 is connected in series with the one-way wrap spring clutch 24. In operation, torque is supplied from the engine accessory drive belt (not shown) to rotate the pulley 12 in a first direction. The inner diameter of the pulley 26 has a feature (not shown) that abuts an end of the torsion spring 18 to transfer force thereto. The other end of the torsion spring 18 is connected to the driving clutch drum 20 (which is not fixed to the pulley 12 but mounted to rotate about an axis defined by the hub 30), thus transferring torque from the pulley 12 to the driving clutch drum 20 via the torsion spring 18. The driven clutch drum 28 is concentrically mounted with the driving clutch drum 20 and the one-way wrap spring clutch 24 is mounted within driving clutch drum 20 and the driven clutch drum 28, i.e., the volutes or coils of the wrap spring clutch 24 extend along the inners bores of the drive and driven drums 20, 28. Thus when the torque is transferred in the first direction (which is capable of being reacted by the one-way wrap spring clutch), the wrap spring clutch coils transfer torque from the driving clutch drum 20 to the driven clutch drum 28. The driven clutch drum 28 is fixed to the hub 30, thus transferring power to the alternator.

When the engine decelerates rapidly, for example during a wide-open throttle shift, the inertia of the alternator causes the hub to over speed the pulley causing the torque to reverse direction. In this case the one-way wrap spring clutch does not couple the torque from the hub and driven clutch drum to the driving clutch drum, whereby the hub and driven clutch drum freewheel relative to the driving clutch drum, torsion spring, and pulley, and vice versa.

SUMMARY

There are at least two problems with the foregoing structure that prevent transmission of very high loads typically seen in front end accessory drive applications.

First, the wrap spring clutch is most highly stressed where it crosses from the driving member to the driven member. Any space between these two members provides a place for the clutch to expand itself beyond the confines of the clutching surfaces. The clutch can become over-stressed, and can break or jam between the members.

Second, the driving and driven members could lose their coaxial alignment. If the driving and driven members are not kept coaxial the wrap spring clutch could twist and becoming overstressed or lose grip on the clutching surface of the driving and/or driven members. Any free rocking in the bearing, or wear in the bushing, can compromise this coaxial alignment.

In addition, when the hub overruns the pulley, the torsion spring could become axially compressed to such an extent that it becomes coil bound (i.e., a state where the coils are mutually engaged with each other and become bound to one another) in which case the torsion spring would lose its isolating capability.

In an aspect, a decoupler is provided that ameliorates one or more of these problems.

In an aspect, a decoupler is provided, including: a hub; a pulley mounted about the hub; a helical coil torsion spring disposed about the hub; a first spring driver fixed to the pulley, the first spring driver having a first stop feature to transfer force to the spring; a second spring driver mounted about the hub and not fixed to the pulley, the second spring driver having a second stop feature to receive force from the spring; a driving clutch drum mounted about the hub, the driving clutch drum being connected to the second spring driver; a driven clutch drum mounted concentrically about the hub with the driving clutch drum, the driven clutch drum being drivingly connected to the hub; a one-way wrap spring clutch mounted about the hub and disposed within the driving clutch drum and driven clutch drum for transferring torque in a first torque flow path direction between the driving clutch drum and driven clutch drum; and an axial biasing member acting between one of (i) the pulley and the driving clutch drum and (ii) the hub and driven clutch drum, so as to force the driving and driven clutch drums together.

Preferably, one of the driving clutch member and the driven clutch member fits within the other to provide an axially aligned fit.

Preferably, an anti-ramp ring is fixed to an inner bore of the pulley and the second spring driver and the anti-ramp ring include complementary features for interlocking one another when an angular displacement between the second spring driver and anti-ramp reaches a pre-selected limit at which point torque is transferred directly between the anti-ramp ring and the second spring driver, bypassing torque transfer via the torsion spring.

In another aspect, a decoupler is provided, comprising: a hub defining an axis and connectable to a rotating element; a pulley rotatable about the axis in a first direction; a helical coil torsion isolation spring disposed about the hub, wherein the isolation spring includes a plurality of coils that are spaced axially from one another including a first end coil at a first axial end of the isolation spring and a second end coil at a second axial end of the isolation spring; a first spring driver fixed to the pulley, the first spring driver having a first spring driver surface to transfer force to the spring and a first end coil support surface for supporting at least a portion of the first end coil; a second spring driver rotatable about the axis and not fixed to the pulley, the second spring driver having a second spring driver surface to receive force from the spring, the second spring driver having a second end coil support surface for supporting at least a portion of the second end coil; a driving clutch member mounted about the hub, the driving clutch member being connected to the second spring driver; a driven clutch member positioned axially adjacent the driving clutch member and mounted concentrically about the hub with the driving clutch member, the driven clutch member being drivingly connected to the hub; and a one-way wrap spring clutch mounted about the hub and disposed to interconnect the driving clutch member and the driven clutch member, the one-way wrap spring clutch being configured to transfer torque in a first flow path direction between the driving clutch member and the driven clutch member. The decoupler is characterized by a first overrun limit surface, connected to the first spring driver, which engages a second overrun limit surface, connected to the second spring driver, when an angular displacement of the second spring driver relative to the first spring driver in the first direction reaches a first selected angular displacement, so as to prevent an increase in the angular displacement between the second and first spring drivers beyond the selected angular displacement, wherein at the first selected angular displacement any axial compression of the isolation spring resulting from rotation of the end coil support surface on the second spring driver relative to the first end coil support surface on the first spring driver is sufficiently small to prevent the coils from binding to one another.

In another aspect, the first spring driver further includes a first torque limit surface that engages a second torque limit surface on the second spring driver when torque transferred from the first spring driver to the second spring driver through the spring causes angular displacement of the first spring driver relative to the second spring driver to reach a selected torque-induced angular displacement, wherein engagement between the first and second torque limit surfaces prevents an increase in the angular displacement of the first spring driver relative to the second spring driver beyond the selected torque-induced angular displacement, and during engagement of the first and second torque limit surfaces any increase in torque that is transferred from the first spring driver to the second spring driver is transferred through the first and second torque limit surfaces.

Optionally, the driving and driven clutch members are both drums and the one-way wrap spring clutch is disposed within the driving clutch drum and driven clutch drum for transferring torque in the first flow path direction between the driving clutch drum and driven clutch drum.

Optionally, the driving and driven clutch members are both shafts and the one-way wrap spring clutch is disposed on the driving clutch shaft and the driven clutch shaft for transferring torque in the first flow path direction between the driving clutch shaft and the driven clutch shaft.

Optionally, one of the driving clutch member and the driven clutch member fits within the other to provide an axially aligned fit.

Optionally, an anti-ramp ring is fixed to an inner bore of the pulley and the second spring driver and the anti-ramp ring include complementary features for interlocking one another when an angular displacement between the second spring driver and anti-ramp reaches a pre-selected limit at which point torque is transferred directly between the anti-ramp ring and the second spring driver, bypassing torque transfer via the torsion spring.

In another aspect, a decoupler is provided, comprising: a hub defining an axis and connectable to a rotating element; a pulley rotatable about the axis in a first direction; a helical coil torsion isolation spring disposed about the hub, wherein the isolation spring includes a plurality of coils that are spaced axially from one another including a first end coil at a first axial end of the isolation spring and a second end coil at a second axial end of the isolation spring; a first spring driver fixed to the pulley, the first spring driver having a first spring driver surface to transfer force to the spring and a first end coil support surface for supporting at least a portion of the first end coil; a second spring driver rotatable about the axis and not fixed to the pulley, the second spring driver having a second spring driver surface to receive force from the spring, the second spring driver having a second end coil support surface for supporting at least a portion of the second end coil; a driving clutch member mounted about the hub, the driving clutch member being connected to the second spring driver; a driven clutch member positioned axially adjacent the driving clutch member and mounted concentrically about the hub with the driving clutch member, the driven clutch member being drivingly connected to the hub; and a one-way wrap spring clutch mounted about the hub and disposed to interconnect the driving clutch member and the driven clutch member, the one-way wrap spring clutch being configured to transfer torque in a first flow path direction between the driving clutch member and the driven clutch member. The decoupler is characterized by a first overrun limit surface, connected to the first spring driver, which engages a second overrun limit surface, connected to the second spring driver, when an angular displacement of the second spring driver relative to the first spring driver in the first direction reaches a first selected angular displacement, so as to prevent an increase in the angular displacement between the second and first spring drivers beyond the selected angular displacement, wherein at the first selected angular displacement any axial compression of the isolation spring resulting from rotation of the end coil support surface on the second spring driver relative to the first end coil support surface on the first spring driver is sufficiently small to prevent the coils from binding to one another.

In another aspect, the first spring driver further includes a first torque limit surface that engages a second torque limit surface on the second spring driver when torque transferred from the first spring driver to the second spring driver through the spring causes angular displacement of the first spring driver relative to the second spring driver to reach a selected torque-induced angular displacement, wherein engagement between the first and second torque limit surfaces prevents an increase in the angular displacement of the first spring driver relative to the second spring driver beyond the selected torque-induced angular displacement, and during engagement of the first and second torque limit surfaces any increase in torque that is transferred from the first spring driver to the second spring driver is transferred through the first and second torque limit surfaces.

Optionally, the driving and driven clutch members are both drums and the one-way wrap spring clutch is disposed within the driving clutch drum and driven clutch drum for transferring torque in the first flow path direction between the driving clutch drum and driven clutch drum.

Optionally, the driving and driven clutch members are both shafts and the one-way wrap spring clutch is disposed on the driving clutch shaft and the driven clutch shaft for transferring torque in the first flow path direction between the driving clutch shaft and the driven clutch shaft.

BRIEF DESCRIPTION OF DRAWINGS

The foregoing and other aspects of the disclosure will be more readily appreciated by reference to the accompanying drawings, wherein.

DETAILED DESCRIPTION

Decoupler with Inboard Wrap Spring Clutch Arrangement (i.e. Drum-to-Drum)

Figure 2:
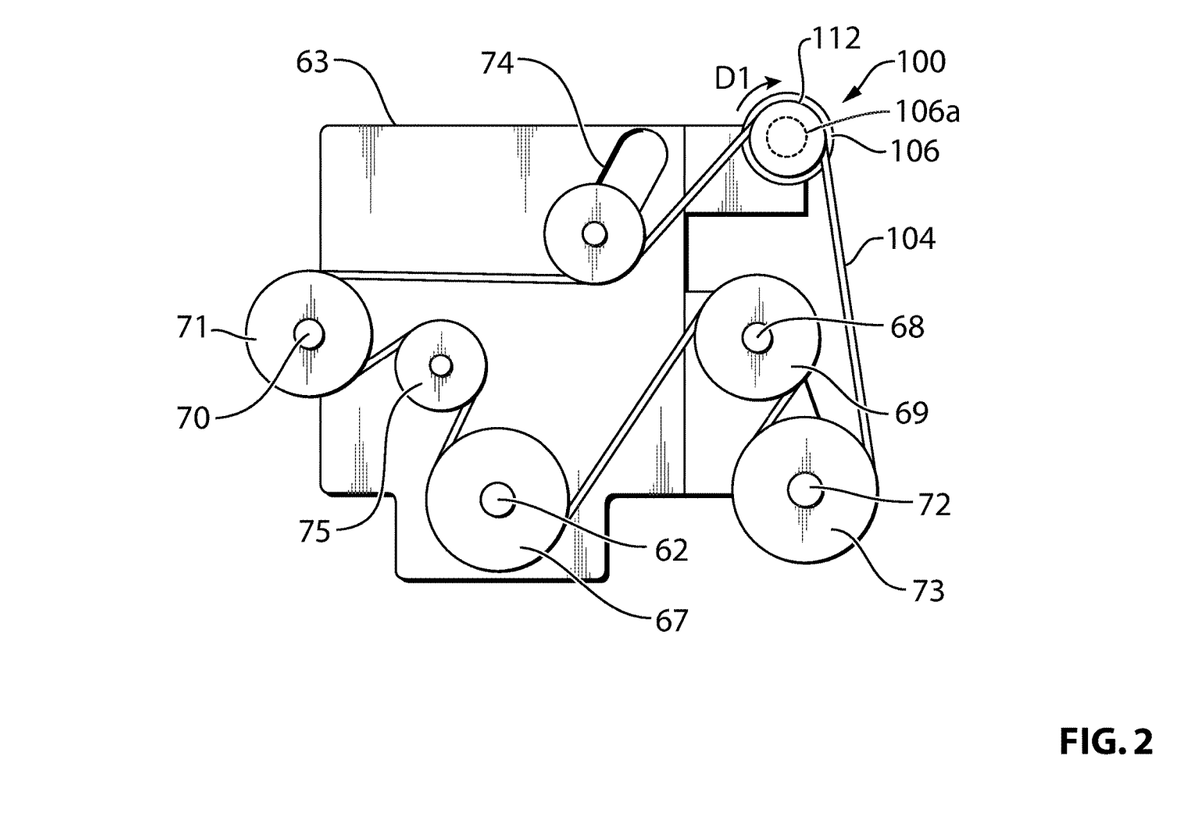
FIG. 2 is an elevation view of an engine including an embodiment of a decoupler.

Reference is made to FIG. 2, which shows an embodiment of a decoupler 100 positioned for use between a shaft 106a from an accessory such as an alternator 106, and an accessory drive belt 104 that is driven by a crankshaft 62 on a vehicle engine 63 (through a pulley 67). The belt 104 may be used to transfer torque from the crankshaft 62 to drive accessories such as the alternator 16, via a pulley 112, a power steering pump 68 via pulley 69, a water pump 70, via pulley 71, an air conditioning compressor 72 via pulley 73, and/or any other suitable accessories. A belt tensioner is shown at 74 for maintaining belt tension, and an idler is shown at 75 for maintaining a suitable amount of belt wrap on selected components. The terms 'pulley' and 'belt' are used for convenience, however it will be understood that the belt may be any suitable endless drive member and the pulleys may instead be any suitable rotary drive member that can transfer power to and from the endless drive member.

Referring to FIG. 2, the decoupler 100 permits torque to be transferred from the pulley 112 to the shaft 106a of the alternator 106 during rotation of the pulley 112 in a first direction (indicated in FIG. 1 at D1), while permitting overrunning of the shaft 106a in the first direction relative to the pulley 112 in situations when there is a deceleration of the pulley 112 relative to the shaft 106a. The decoupler 100 includes a pulley 112 mounted for rotation about a hub 130 (which may also be referred to as a shaft connection member 130), via a ball bearing 114 mounted about a shouldered portion 130D of the hub 130. The hub 130 connects to the shaft 106a of the alternator 106. The pulley 112 has an outer drive surface 112A is connected to an endless drive member (such as a V-belt) shown at 104 of an engine front end accessory drive system. The pulley 112 also has an inner bore 112B that houses the majority of the decoupler components.

A spring driver 132 is fixed to the inner bore 112B of the pulley 112 and mounted about the hub 130 via a bushing 117. A helical coil torsion spring 118 is connected to the spring driver 132. More particularly, the spring driver 132 has a stop feature 132A on an inner axial surface thereof, including a first spring driver surface 132B, for abutment against a first end 118A of the torsion spring 118. The spring driver 132 also includes an end coil support surface 132C for supporting an end coil of the torsion spring 118. The height of the support surface 132C is sized to provide an incline or ramp so as to conform to the unstressed slope or helix angle of the torsion spring 118. (Alternatively, the spring driver 132 may be configured so that its inner axial surface is inclined or ramped along 132D to abut a longer stretch or run of the end coil.)

A driving clutch drum 120 is mounted about the hub 130 and a spring driver 122 is fixed to the driving clutch drum 120. The spring driver 122 includes a stop feature 122A, including a second spring driver surface 122B, for transfer of force with a second end 118B of the torsion spring 118. The spring driver 122 also includes an end coil support surface 122C for supporting an end coil of the torsion spring 118. The height of the end coil support surface 122B is sized to provide an incline or ramp so as to conform to the unstressed slope or helix angle of the torsion spring 118. (Alternatively, the spring driver 122 may be configured so that its inner axial surface is inclined or ramped along 122D to abut a longer stretch or run of the end coil.)

A spring anti-ramp ring 140 is fixedly connected to the inner bore 112B of the pulley, such as through a press fit.

A thrust washer 134 and a wave spring 136 are disposed in the anti-ramp ring 140 to provide an axial force against the driving clutch drum 120. More particularly, the anti-ramp ring 140 has a radial wall 140A that seats the thrust washer 134. The driving clutch drum 120 has a folded butt end 120B that terminates in a planetary flange 120C against which the spring driver 122 bears. The wave spring 136 is disposed over the butt end 120B and bears between the planetary flange 120C and the thrust washer 134/anti-ramp ring 140.

The anti-ramp ring 140 also includes an axial wall 140B with axially extending arcuate tabs 140C that define arcuate slots 140D in the ring 140. The planetary flange 120C of the driving clutch drum 120 also includes radially extending tabs 120D that are disposed in the arcuate slots 140D and cooperate with the arcuate tabs 140D as discussed in greater detail below.

Figure 6:
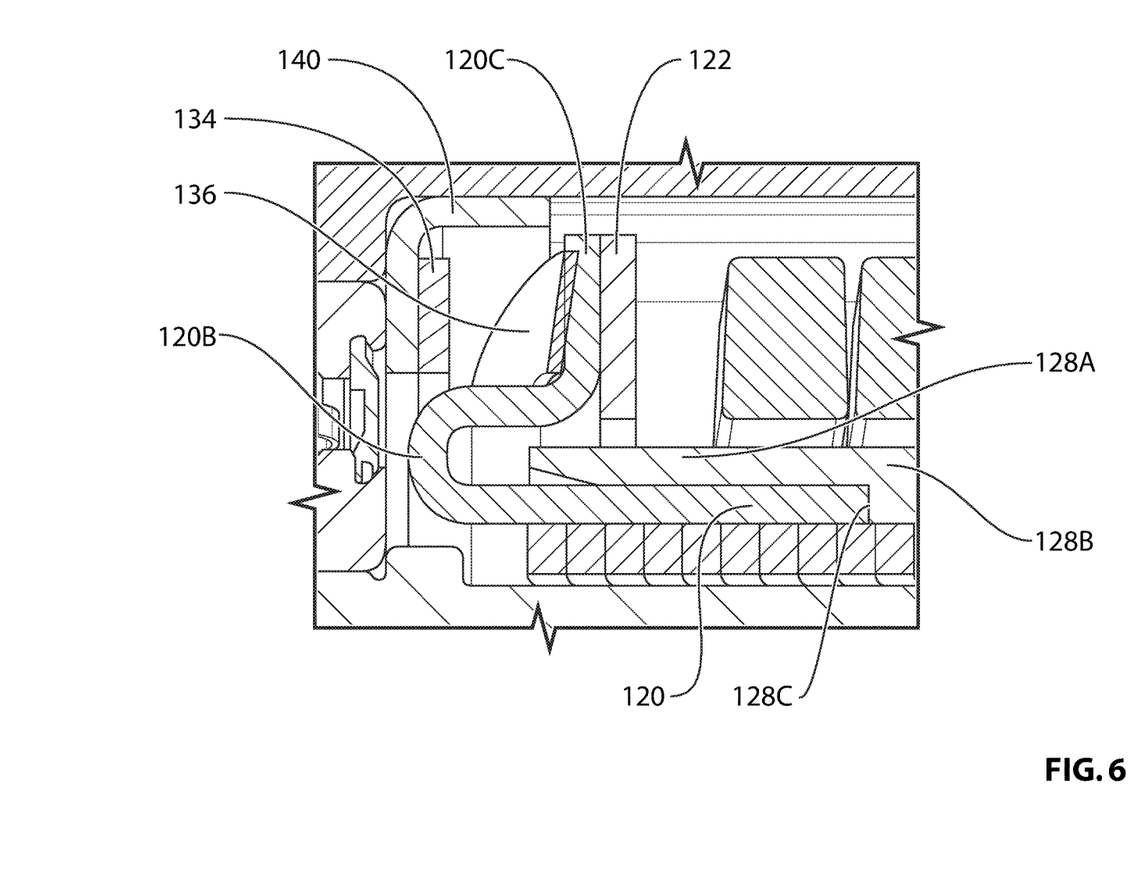
FIG. 6 is a magnified sectional view of a portion of the decoupler shown in FIG. 5.

A driven clutch drum 128 is mounted about the hub 130. As seen best in the detail view of FIG. 6, the drive clutch drum 128 has an inner bore end portion 128A with a wider inner diameter than an immediately adjacent inner bore portion 128B. A flat radial end face 128C is defined at the junction between the bore portions 128A and 128B. The driving clutch drum 120 fits within the inner bore end portion 128A of the driven clutch drum 128 and seats against its flat radial end face 128C.

The driven clutch drum 128 also includes an integrated ring gear 128D. The hub 130 also features a splined ring 130C on the outer surface thereof for driving interconnection with the drive clutch drum ring gear 128D.

The hub 130 has a bore 130A at one end thereof for connection to an alternator hub 106a (FIG. 2). The other end of the hub 130 has a receptacle 130B for receiving the head of a driving tool.

Axial Alignment

In operation, torque is supplied from the endless drive element to rotate the pulley 112 in a first direction. The spring driver 132, being locked to the pulley 112, drives the torsion spring 118 via the stop feature 132A and the first spring driver surface 132B that abuts the first end 118A of the torsion spring 118. When the torque flow path is in a first direction the torsion spring 118 expands radially. The other end 118B of the torsion spring 118 drives the second spring driver surface 122B of the stop feature 122A of the spring driver 122. This, in turn, rotates the driving clutch drum 120 in the first direction. The driving clutch drum 120 is pushed axially toward the driven clutch drum 128 by the wave spring 136 which, as discussed above, is supported by the anti-ramp ring 140 that is fixed to the pulley. (Consequently, while there may be some angular displacement of the driving clutch drum 120 relative to the pulley 112 as the torsion spring 118 resiliently transfers load between the pulley 112 and the driving clutch drum 120, the latter should not rotate at high speed relative to the former.) Thus, as seen best in the detail view of FIG. 6, the wave spring 136 forces the clutching drums 120, 128 tightly together, eliminating any space for the coil(s) of the wrap spring clutch 124 to move into. In addition, one of the clutching drums (driving clutch drum 120) fits inside the other (driven clutch drum 128), maintaining alignment. When the torque flow path is in the first direction, due to the friction against the inner bores of the driving and driven clutch drums 120, 128, the wrap spring clutch 124 is urged to expand against the inner bores of the driving and driven clutch drums 120, 128. The wrap spring clutch 12 thus couples the driving and driven clutch drums 120, 128, and torque is transferred between the drums 120, 128. In turn, the driven clutch drum 128 rotates the hub 130 via the splined interconnection therebetween and the hub 130 rotates the alternator.

The embodiment shown and discussed above utilized a wave spring as an axial biasing member. However, any other mechanism that accomplishes the same function, such as a compression spring, could be utilized in the alternative. Moreover, the axial biasing member was shown acting between the pulley and the driving clutch drum 120. However, the axial biasing member could also be mounted to act between the hub 130 and the driven clutch drum 128. Likewise, the driving clutch drum 120 is shown as fitting into the driven clutch drum 128 but the reverse is equally viable. Similarly, a number of components that are shown as separate parts could be integrated with other parts. For example, the spring driver 132 and anti-ramp spring 140 could be integrally formed with the pulley 116. Likewise, the driven clutch drum 128 could be integrally formed with the hub 130.

Anti-Ramp Feature

When the engine decelerates rapidly, for example, during a wide-open throttle shift, the inertia of the alternator causes the hub 130 to overrun the pulley 112, which causes the torque flow path to reverse direction. In this case the one-way wrap spring clutch 124 is urged to constrict and thus does not couple or transfer torque between the driven clutch drum 128 and the driving clutch drum 120. Consequently, the driving clutch drum 120, torsion spring 118, and pulley 112 rotate freely relative to the hub 130 and the driven clutch drum 128, and vice versa.

In this freewheeling state the hub 130 and the driven clutch drum 128 rotate at the same speed. The pulley 112 decelerates due to the reduced torque from the endless drive element. However, friction between the driving clutch drum 120 and the wrap spring clutch 114 as well as the inertia of the driving clutch drum 120 could cause it to move at a different rate than the spring driver 132. This difference in speed could cause the second spring driver surface 122B of the spring driver stop feature 122A to move away from the torsion spring end 118B. As the end coil of the torsion spring 118 lies effectively on an incline provided by the end coil support surface 120C, the torsion spring 118 could rewind from its drive position (where torsion spring end 118B contacts the second spring driver surface 122B) so as to compress axially. In this event the coils of the torsion spring 118 could become mutually engaged and bind against one another, and thereafter not unwind, in which case the decoupler 100 would lose its isolating function.

The problem is curtailed by causing the fixedly connected driving clutch drum 120 to interlock against the anti-ramp ring 140 when the angular displacement between the two components reached a predetermined limit. This angular limit is defined by the length of the arcuate slots 140D of the anti-ramp ring 140. More particularly, the anti-ramp ring 140 has first overrun limit surface 140E at the edge of the arcuate slot 140D and the driving clutch drum 120 has an overrun limit surface 120E at the edge of the radially extending tab 120D. Because of the presence of the first and second overrun limit surfaces 140E and 120E, the driving clutch drum 120 cannot overrun the spring driver 132 by more than a selected angular distance before the first and second overrun limit surfaces 140E and 120E engage each other. The angular displacement limit is preferably selected to preclude axial binding of the torsion spring 118 to the point where its coils can bind one other. For example, the angular displacement limit can be set so that the first and second overrun limit surfaces 140E and 120E contact one another at the onset of freewheeling. Alternatively, the angular displacement limit can be set to allow the torsion spring 118 to axially compress for a limited amount but with a sufficient margin of safety to ensure that its coils do not bind. For example, the angular displacement limit can be set to preclude the spring coils from contacting one another. When the driving clutch drum 120 and the pulley 112 interlock, torque or rotary power is transferred directly therebetween bypassing torque transfer through the torsion spring 118.

In the embodiment shown, the first and second overrun limit surfaces 140E, 120E are provided on the arcuate slot 140D and the radially extending tab 120D. However the overrun limit surface 140E may be incorporated into the anti-ramp ring 140 or the pulley 112 or the spring driver 132 in any other suitable way and the overrun limit surface 120E may likewise be incorporated into the driving clutch drum 120 or the spring driver 122 in any other suitable way. In the embodiment shown, two overrun limit surfaces 140E and two overrun limit surfaces 120E are provided. However, there could be one of each surface 140E and 120E provided or three or more of each surface 140E and 120E provided.

Torque Limiting Feature

Figure 3:
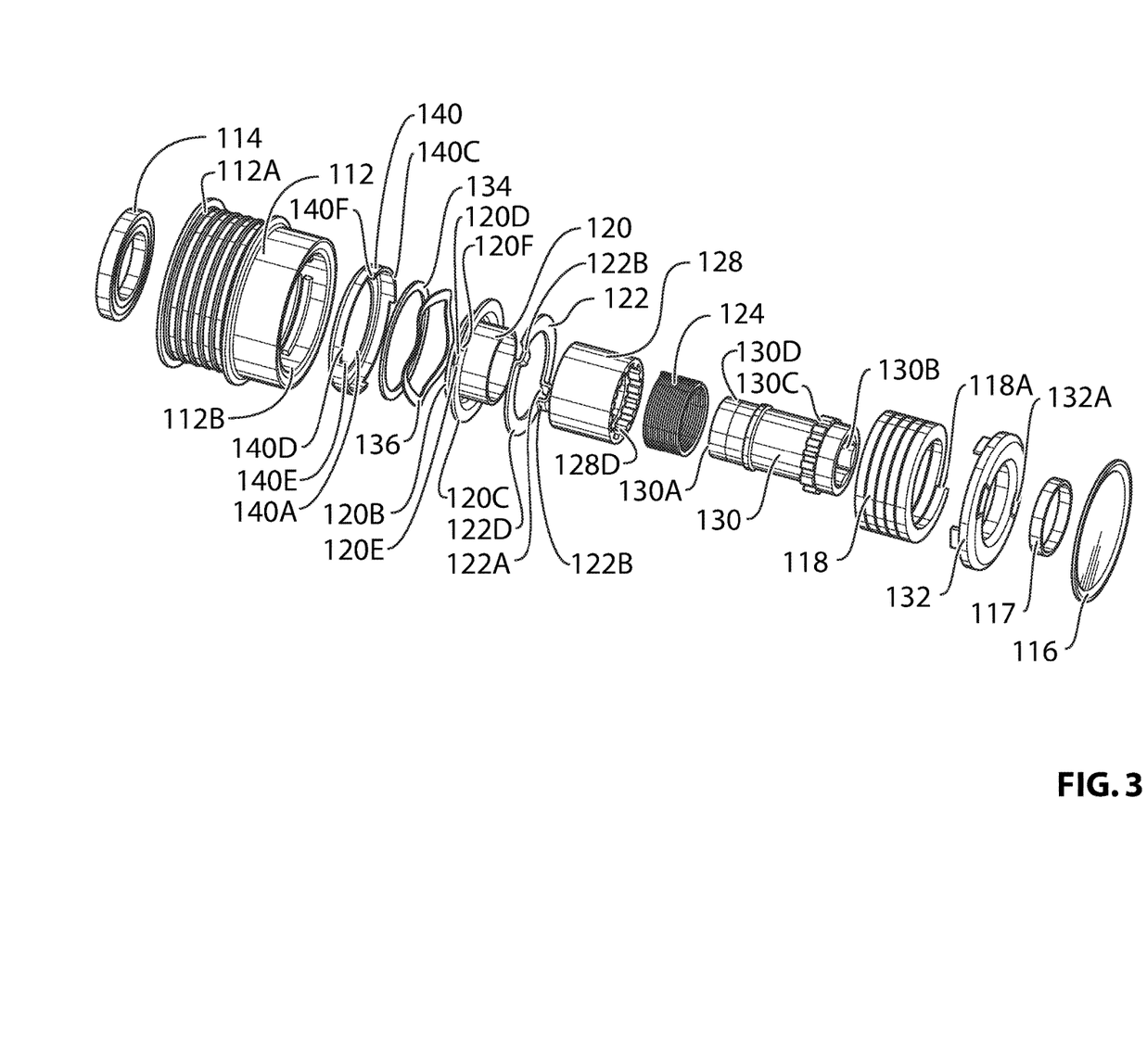
FIG. 3 is an exploded perspective view of the decoupler shown in FIG. 2.
Figure 4:
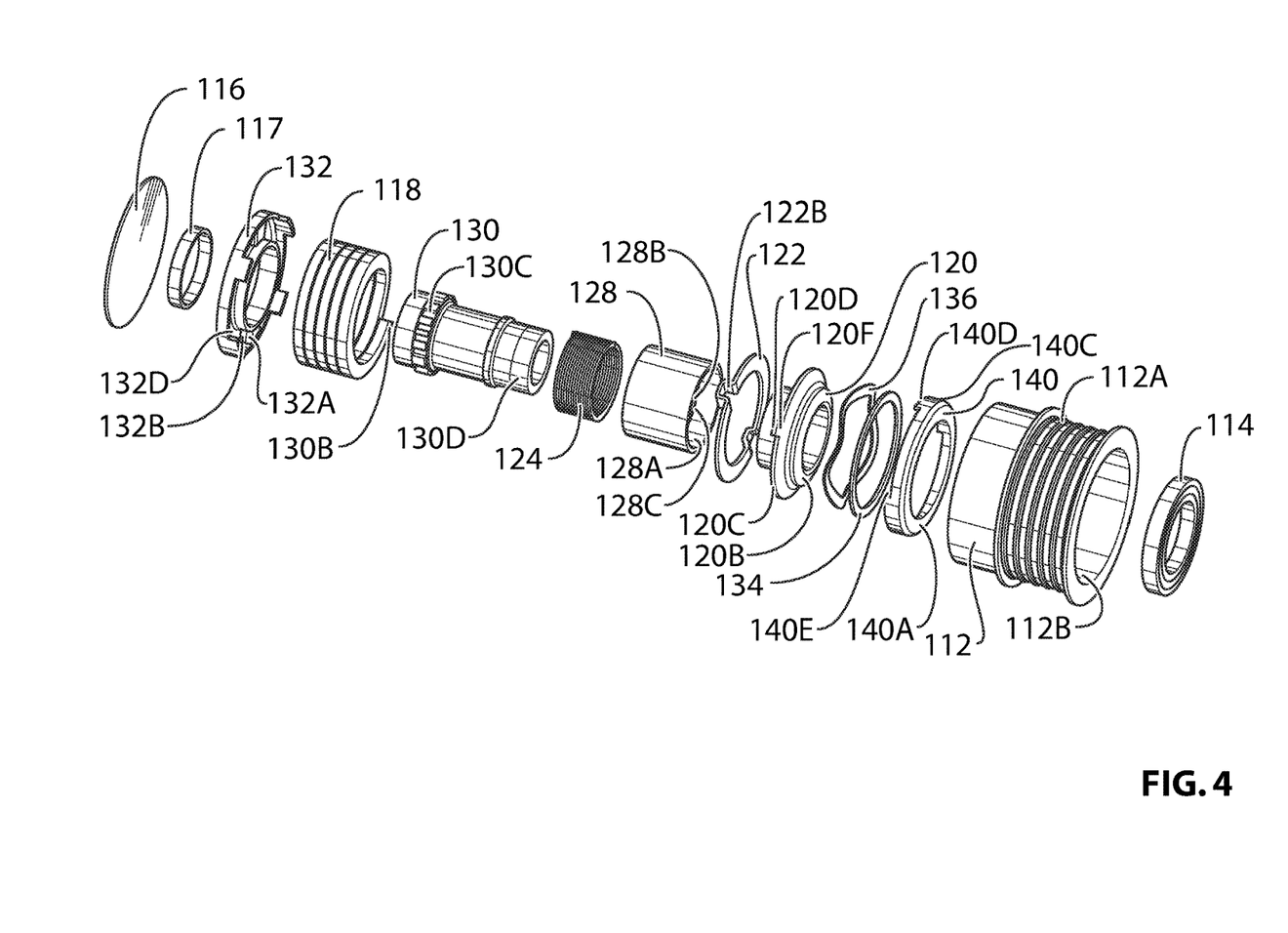
FIG. 4 is another exploded perspective view of the decoupler shown in FIG. 2.
Figure 5:
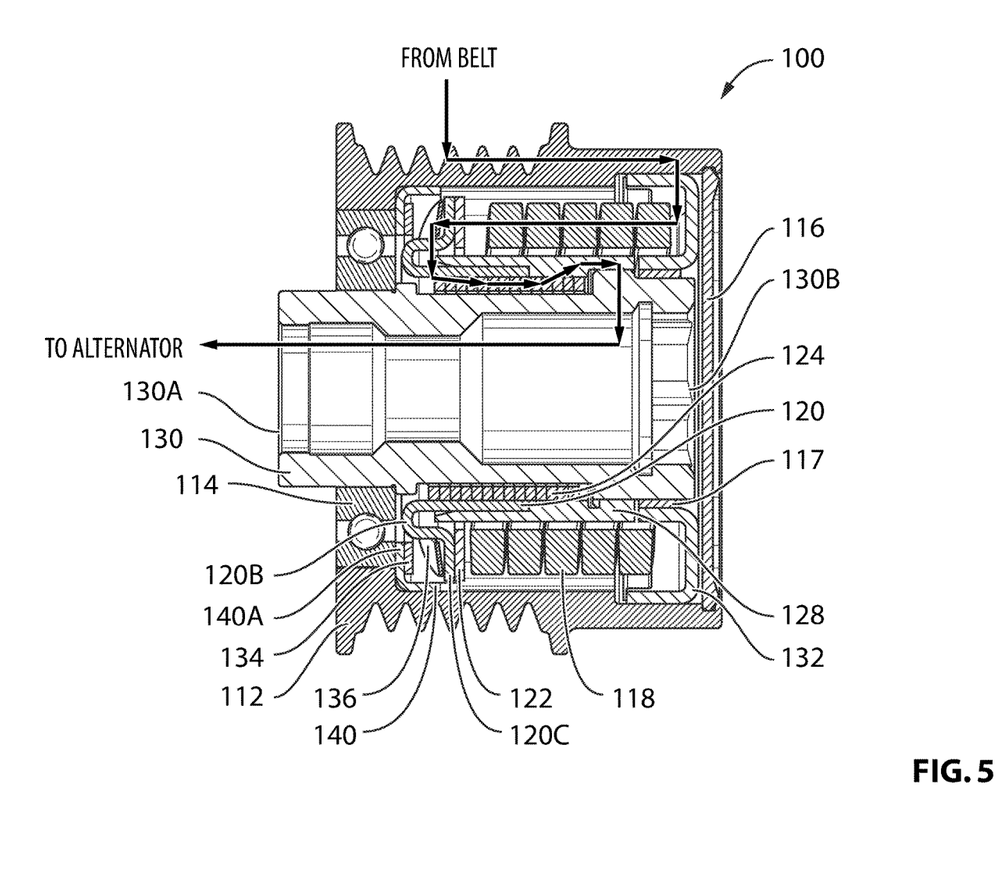
FIG. 5 is a sectional side view of the decoupler shown in FIG. 2.

As shown in FIGS. 2 and 3, the anti-ramp ring 140 may have a first torque limit surface 140F at an opposing edge of the arcuate slot 140D and the driving clutch drum 120 may have a second torque limit surface 120F at an opposing edge of the radially extending tab 120D. During operation of the decoupler 100, when the pulley 112 is driving the hub 130, the first and second torque limit surfaces 140F and 120F are spaced apart rotationally by a selected angular displacement. In general, torque applied to the pulley 112 by the endless drive element 104 (FIG. 2) is transferred from the pulley 112 to the spring driver 132, then the isolating torsion spring 118, then the driving clutch drum 120, and finally to the hub 130 via the driven clutch drum 128 and wrap spring clutch 124. As the torque transferred increases, the amount of torsional flexure or twist present in the torsion spring 118 increases and the angular displacement between the spring driver 132 and the driving clutch drum 120 increases such that the first and second torque limit surfaces 140F and 120F approach each other. If the torque reaches a selected threshold torque, the angular displacement between the spring driver 132/anti-ramp ring 140 and the driving clutch drum 120 changes such that the first and second torque limit surfaces 140F and 120F engage each other. Due to their engagement, any increase in torque transferred beyond this selected threshold torque is transferred through the first and second torque limit surfaces 140F and 120F and not through the torsion spring 118. Thus the first and second torque limit surfaces 140F and 120F serve to limit the maximum amount of torque that the spring 118 will transfer. This can be useful in preventing the spring 118 from becoming overstressed, and/or in preventing the spring 118 from becoming so uncoiled that it engages and galls the radially inner surface of the pulley 118.

In the embodiment shown, the first and second torque limit surfaces 140F, 120F are provided on the arcuate slot 140D and the radially extending tab 120D. However the torque limit surface 140F may be incorporated into the anti-ramp ring 140 or the pulley 112 or the spring driver 132 in any other suitable way and the overrun limit surface 120F may likewise be incorporated into the driving clutch drum 120 or the spring driver 122 in any other suitable way. In the embodiment shown, two first torque limit surfaces 140F and two second torque limit surfaces 120F are provided. However, there could be one of each surface 140F and 120F provided or three or more of each surface 140F and 120F provided.

In the embodiment shown, the anti-ramp ring 140 and driving clutch drum 120 include both the overrun limit surfaces 140E and 120E (i.e. the anti-ramp feature) and torque limit surfaces 140F and 120F (i.e. the torque-limiting feature). However, it is alternatively possible for the anti-ramp ring 140 and driving clutch drum 120 to include one of these features and not the other.

Preloading the Torsion Spring

The overrun limit surfaces 140E and 120E have been described as being used to prevent the incline provided by the end coil support surface 120C on the driving clutch drum 120 from rotating during an overrun situation and causing compression and binding of the torsion spring coils. However, in some embodiments, the overrun limit surfaces 140E and 120E may be positioned so that, when the decoupler is in a rest state, there is a selected amount of preload in the torsion spring 118. In such embodiments, when the decoupler is in a rest state, the first and second overrun limit surfaces 140E and 120E would abut each other, and the positions of the spring driver surfaces 122B and 132B may be positioned relative to the overrun limit surfaces 140E and 120E so as to cause flexure of the torsion spring 118. Due to the abutment of the overrun limit surfaces 140E and 120E the spring 28 is thus preloaded. As a result, any torque input from the pulley 112 would have to overcome the preload in the torsion spring 118 in order to move the second spring driver 122 relative to the first spring driver 132. Thus for a selected range of torques the overrun limit surfaces 140E and 120E remain in abutment with one another. As a result of this abutment, at least some of the 'chatter' or 'rattle' that might be present in some non-preloaded decouplers in certain situations may be reduced or eliminated. Such a situation may be, for example, when there is a relatively low load on the alternator (to which the decoupler may be connected) and there are relatively high torsionals from the engine. Torsionals are torsional vibrations (variations in the speed of the crankshaft of any internal combustion engine) that are the natural result of the movement of the reciprocating movement of the pistons of such engines. Torsionals can be particularly strong in certain types of engines and at certain RPM, such as, for example, at idle in engines with low cylinder counts (e.g. two-, three- or four-cylinder engines) and/or in some diesel engines. These torsionals can be transmitted to the endless drive element from the crankshaft and from the endless drive element into the decoupler. By reducing or eliminating chatter that can result from such torsionals, the decoupler may operate more quietly, and may have an improved service life. In embodiments where the overrun limit surfaces 140E and 120E are provided to preload the spring 118, the overrun limit surfaces 140E and 120E may be referred to as spring preload surfaces 140E and 120E.

Decoupler With Outboard Wrap Spring Clutch Arrangement (i.e. Shaft-To-Shaft)

Figure 7:
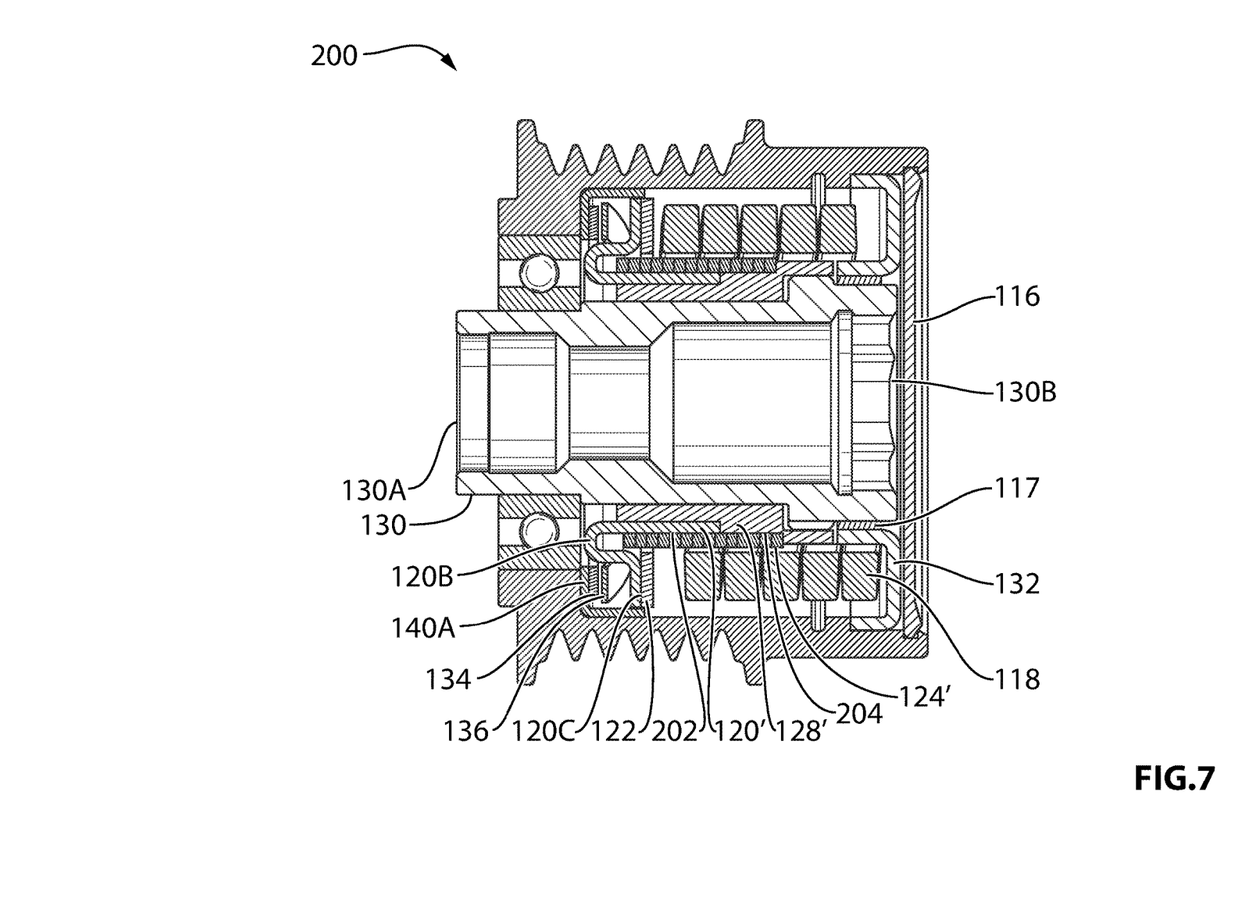
FIG. 7 is a sectional side view of another embodiment of a decoupler.

FIG. 7 shows a second preferred embodiment of a decoupler 200 that utilizes a concentric drum arrangement interconnected by an outboard one wrap spring clutch as discussed below.

The decoupler 200 is similar to the decoupler 100. The components that are the same are given the same reference numbers and are not discussed further. The components that are similar but situated in a different location are given the same but primed reference numbers.

In the decoupler 200, the one-way wrap spring clutch 124' is situated outboard of a driving clutch shaft 120' (that is similar to driving clutch drum 120 except that it is engaged on its outer surface 202 instead of its inner surface with the one-way wrap spring clutch 124') and driven clutch shaft 128' (that is similar to driving clutch drum 128 except that it is engaged on its outer surface 204 instead of its inner surface with the clutch 124') and is configured to contract about the outer surfaces 202 and 204 of the driving clutch shaft 120' and driven clutch shaft 128' to couple and transfer torque along a first torque flow path from the driving clutch shaft 120' to the driven clutch shaft 128'. The one-way wrap spring clutch 124' is not configured to transfer torque in a reverse torque flow path from the driven clutch shaft 128' to the driving clutch shaft 120'. The decoupler 200 may otherwise operate similarly to the decoupler 100.

As described above, the wrap spring clutch 124 engages driving and driven clutch drums 120 and 128, and the wrap spring clutch 124' engages driving and driven clutch shafts 120' and 128'. More generally, the wrap spring clutch (124 or 124', as appropriate) engages driving and driven clutch members, which are concentric and axially adjacent one another. In some embodiments the driving and driven clutch members are drums. In other embodiments the driving and driven clutch members are shafts.

Those skilled in the art will understand that a variety of other modifications may be effected to the embodiments described herein without departing from the scope of the appended claims.

The invention claimed is:

1. A decoupler, comprising: a hub; a pulley mounted about the hub; a helical coil torsion spring disposed about the hub; a first spring driver fixed to the pulley, the first spring driver positioned to transfer force to the helical coil torsion spring; a driving clutch member positioned to receive force from the first spring driver through the helical coil torsion spring; a driven clutch member positioned axially adjacent the driving clutch member and mounted concentrically therewith, the driven clutch member being drivingly connected to the hub; a one-way wrap spring clutch mounted about the hub and disposed to interconnect the driving clutch member and the driven clutch member, wherein, during rotation of the hub and pulley in a first direction, the one-way wrap spring clutch being positioned to transfer torque from the driving clutch member to the driven clutch member and to inhibit torque transfer from the driven clutch member to driving clutch member; and an axial biasing member that urges the driving and driven clutch members axially together, further comprising an anti-ramp surface that is fixed relative to the pulley and that is interlockable with a complementary surface that is fixed relative to the driving clutch member, when an angular displacement between the pulley and the driving clutch member reaches a pre-selected limit, the anti-ramp surface engages the complementary surface to transfer torque thereto partially bypassing torque transfer via the torsion spring.

2. A decoupler as claimed in claim 1, wherein the driving clutch member is a driving clutch drum and the driven clutch member is a driven clutch drum, wherein the one-way wrap spring clutch is disposed within the driving clutch drum and the driven clutch drum to transfer torque from the driving clutch drum to the driven clutch drum.

3. A decoupler as claimed in claim 1, wherein the driving clutch member is a driving clutch shaft and the driven clutch member is a driven clutch shaft, wherein the one-way wrap spring clutch is disposed on the driving clutch shaft and the driven clutch shaft to transfer torque from the driving clutch shaft to the driven clutch shaft.

4. A decoupler as claimed in claim 1, wherein one of the driving clutch member and the driven clutch member fits within the other of the driving clutch member and the driven clutch member.

5. A decoupler, comprising:
- a hub defining an axis and connectable to a rotating element;
- a pulley rotatable about the axis in a first direction;
- a helical coil torsion isolation spring disposed about the hub, wherein the isolation spring includes a plurality of coils that are spaced axially from one another including a first end coil at a first axial end of the isolation spring and a second end coil at a second axial end of the isolation spring;
- a first spring driver fixed to the pulley, the first spring driver having a first spring driver surface to transfer force to the isolation spring and a first end coil support surface for supporting at least a portion of the first end coil;
- a second spring driver rotatable about the axis and not fixed to the pulley, the second spring driver having a second spring driver surface to receive force from the isolation spring, the second spring driver having a second end coil support surface for supporting at least a portion of the second end coil;
- a driving clutch member mounted about the hub, the driving clutch member being connected to the second spring driver;
- a driven clutch member positioned axially adjacent the driving clutch member and mounted concentrically about the hub with the driving clutch member, the driven clutch member being drivingly connected to the hub; and
- a one-way wrap spring clutch mounted about the hub and disposed to interconnect the driving clutch member and the driven clutch member, the one-way wrap spring clutch being configured to transfer torque in a first flow path direction between the driving clutch member and the driven clutch member;

characterized in that the first spring driver further includes a first torque limit surface that engages a second torque limit surface on the second spring driver when torque transferred from the first spring driver to the second spring driver through the isolation spring causes angular displacement of the first spring driver relative to the second spring driver to reach a selected torque-induced angular displacement, wherein engagement between the first and second torque limit surfaces prevents an increase in the angular displacement of the first spring driver relative to the second spring driver beyond the selected torque-induced angular displacement, and during engagement of the first and second torque limit surfaces any increase in torque that is transferred from the first spring driver to the second spring driver is transferred through the first and second torque limit surfaces and not through the isolation spring.

6. A decoupler as claimed in claim 5, including an anti-ramp ring fixed to the pulley and the first spring driver, wherein the first torque limit surface is located on the anti-ramp ring.

7. A decoupler as claimed in claim 5, wherein the second spring driver is fixed to the driving clutch drum and the second torque limit surface is located on the driving clutch drum.

8. A decoupler as claimed in claim 5, wherein the driving clutch member is a driving clutch drum and the driven clutch member is a driven clutch drum, wherein the one-way wrap spring clutch is disposed within the driving clutch drum and driven clutch drum for transferring torque in the first flow path direction between the driving clutch drum and driven clutch drum.

9. A decoupler as claimed in claim 5, wherein the driving clutch member is a driving clutch shaft and the driven clutch member is a driven clutch shaft, wherein the one-way wrap spring clutch is disposed on the driving clutch shaft and driven clutch shaft for transferring torque in the first flow path direction between the driving clutch shaft and driven clutch shaft.

\* \* \* \* \*